United States Patent [19]

Arnett et al.

[11] Patent Number: 4,997,500
[45] Date of Patent: Mar. 5, 1991

[54] METHOD FOR JOINING THERMOPLASTIC PARTS

[75] Inventors: Jaime R. Arnett, Noblesville; Robert J. O'Connor, Greenfield, both of Ind.

[73] Assignee: AT&T Bell Laboratories, Murray Hill, N.J.

[21] Appl. No.: 399,091

[22] Filed: Aug. 28, 1989

[51] Int. Cl.$^5$ ............................................. B29C 65/06
[52] U.S. Cl. .................................. 156/73.5; 156/92; 156/294
[58] Field of Search ............ 156/73.5, 294, 580, 156/92; 228/112; 264/23

[56] References Cited

U.S. PATENT DOCUMENTS

| | | | |
|---|---|---|---|
| 2,942,748 | 6/1960 | Anderson | 156/294 |
| 3,184,353 | 5/1965 | Balamuth et al. | 156/92 |
| 3,444,018 | 5/1969 | Hewitt | 156/73.5 |
| 4,152,185 | 5/1979 | Tessenske | 156/94 |

OTHER PUBLICATIONS

SAE Technical Paper Series, No. 860581, "Welding Plastics for the Automotive Industry," Martin N. Watson 2/24–28/86.
Machine Design, "1987 Fastening, Joining & Assembly Reference Issue", pp. 44–48, Nov. 19, 1987.

*Primary Examiner*—Michael G. Wityshyn
*Attorney, Agent, or Firm*—Michael A. Morra

[57] ABSTRACT

A technique for permanently joining thermoplastic parts in a single stroke converts kinetic energy into thermal energy. In this technique, one of the thermoplastic parts includes a linear shaft while the other includes a cavity having the same general shape but being slightly smaller in its cross-section. The thermoplastic parts are permanently joined when the shaft is thrust into the cavity at a velocity that exceeds a predetermined minimum value which is a function of the thermoplastic materials used and the relative dimensions of the shaft and cavity. An interference fit between the shaft and cavity causes frictional heat to be generated which melts the contacting surfaces and thus welds the parts together after a brief cooling period.

8 Claims, 3 Drawing Sheets

METHOD FOR JOINING THERMOPLASTIC PARTS

TECHNICAL FIELD

This invention relates to a method and apparatus for permanently joining plastic parts together, and more particularly to a method wherein thermoplastic parts are welded.

BACKGROUND OF THE INVENTION

The use of plastics has expanded significantly in recent years, in part because they are inexpensive, easily molded into desired shapes, electrically non-conductive, lightweight and offer long service life. The joining of plastics is crucial to the more widespread use of these materials and, although plastics have been joined for many years, there is a need for new welding techniques that are simpler, faster and less expensive. Plastics can be joined by mechanical fasteners, adhesives or welding. Mechanical fasteners are common and are suitable for most materials but can be expensive and may not provide a permanent (when desirable) joint or adequate properties. Adhesives give good properties and sound joints but can be difficult to handle, require care with joint and surface preparation, and are slow. Welding is ideally suited to use in the mass production industries as the techniques are economical, simple, fast, reliable and capable of making joints with static mechanical properties close to those of the parent material.

One conventional technique for joining plastic parts together is the use of hooks and latches which interlock when pressed together. However, those very features needed to effectively attach one plastic part to another now make the mold tool more complicated and expensive. Intricately shaped plastic parts are more expensive than simply shaped ones because their molds include tools that must be sequentially removed from the finished part in multiple directions.

Thermoplastic parts may be temporarily joined by press fitting where a shaft is pressed into a boss of substantially the same shape but slightly smaller dimensions. However, after a period of time these parts are prone to separate—especially when subjected to moisture, temperature variations, vibration or frequent handling. To overcome this problem, manufacturers use solvents to soften thermoplastic parts which are then clamped or pressed together until the solvent evaporates. Similarly, the use of adhesives or bonding materials generally require long curing periods and contribute to air pollution. Long curing periods are inconsistent with modern manufacturing techniques such as just-in-time fabrication used to reduce factory inventory and lower costs. Although the evaporation rate of a solvent or the curing rate of a bonding material may be hastened by heating, it is desirable to simplify, further shorten, and thereby cost reduce the process.

A survey of techniques for permanently joining plastics is disclosed in a paper entitled "Welding Plastics for the Automotive Industry" by Martin N. Watson, SAE Technical Paper Series 860581, Feb. 24–28, 1986. The disclosed techniques include: (i) *Ultrasonic Welding*—a bonding process that utilizes high frequency mechanical vibrations. The parts to be assembled are held together under pressure and then subjected to ultrasonic vibration at right angles to the contact area so that longitudinal vibrations are transmitted through the component. Although ultrasonic welding is well suited to mass production and offers high speed, tooling is expensive. (ii) *Spin Welding*—friction heating due to spin, angular or orbital rotation of thermoplastic material to cause melting/welding to occur. A disadvantage of the spin welding process is that in its simplest form, it is only suitable for applications in which at least one of the components is circular and requires no angular alignment. (iii) *Vibration Welding*—frictional heating generated by the relative movement between two parts to be welded which are held under pressure. Once molten material has been generated at the joint interface, vibration is stopped, the parts are aligned and the weld solidifies on cooling. Weld times of 1–5 seconds are possible with applied vibrations being typically 100–240 Hz, 150 mm amplitude, and the pressure of $1-4 N/mm^2$. This technique is frequently used for the welding of various mass produced thermoplastic components. While these various techniques are generally useful, it is desirable to further decrease weld time, and to simplify the equipment needed to carry out the welding process.

SUMMARY OF THE INVENTION

First and second thermoplastic parts are joined by a novel process that uses frictionally created heat to perform welding. The first thermoplastic part includes a shaft, and the second thermoplastic part includes a cavity that has substantially the same shape as the shaft but is slightly smaller in cross-section. The shaft is thrust into the cavity at a velocity sufficient to cause melting along the mating surfaces to occur and, after a brief cooling period, the parts are permanently welded.

In one illustrative embodiment of the invention, shafts and cavities are molded into the body of thermoplastic parts to be joined.

In another illustrative embodiment of the invention, the shaft is an independent part, made from thermoplastic material, and used to join two other parts together, one of which includes a cavity also made from thermoplastic material.

It is an advantage of the present invention that the shafts and cavities can be molded using tools that separate with a straight pull.

DETAILED DESCRIPTION

The welding of plastics is confined to thermoplastic materials (i.e., those which can be melted or softened by heat without degradation). Examples of thermoplastic materials include: Acrylonitrile-Butadiene-Styrene (ABS), polycarbonate, and polyvinyl chloride (PVC). Thermoset plastics, on the other hand, do not soften on heating and cannot be welded. Examples of thermoset materials include: Formica TM, phenolics and Bakelite TM. The present invention is concerned with a novel technique for joining parts made from thermoplastic materials.

Figure 1:
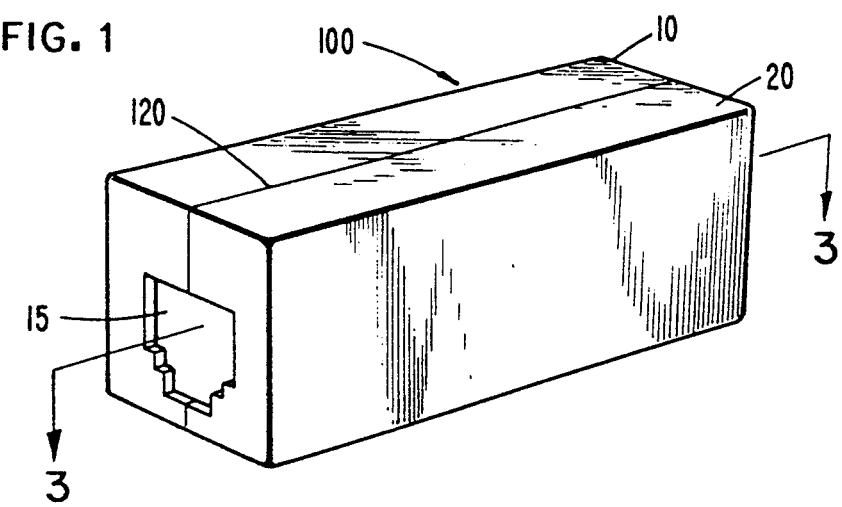
FIG. 1 is a housing for telephone equipment made from thermoplastic materials in accordance with the invention.

FIG. 1 discloses a thermoplastic housing 100 for containing electrical components such as used in providing telephone service. Housing 100 contains, for example, components for filtering radio frequency electrical signals from a telephone line. It is adapted to be series-connected with the telephone line using modular plugs (not shown) at each end thereof. During normal use, a modular plug fits into opening 15 to electrically engage the circuitry contained within the housing. Housing 100 comprises a pair of mating parts 10, 20 which meet along seam 120. In this example embodiment, parts 10 and 20 are identical.

Figure 2:
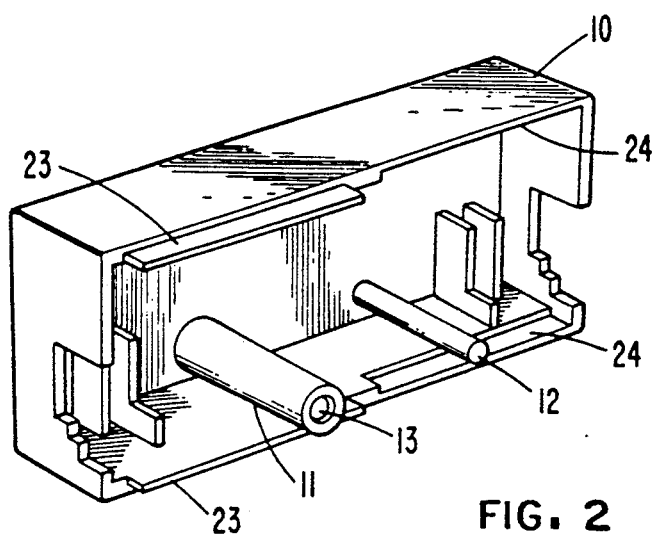
FIG. 2 discloses one part of the FIG. 1 housing showing an extended cavity and a shaft in accordance with the invention.

FIG. 2 reveals the inside structure of part 10 which is molded from a thermoplastic material such as ABS. Protrusions 23 of part 10 are positioned to interlock with complementary recessed areas of mating part 20. Similarly, recessed areas 24 of part 10 are positioned to interlock with complementary protrusions of mating part 20. These recessed areas and protrusions operate to guides parts 10 and 20 together during manufacture and provide structural stability thereafter. Molded into the structure of part 10 are boss 11 and shaft 12. Within boss 11 is a cavity 13 which is adapted to receive a shaft, of slightly larger dimensions, for the purpose of joining parts 10 and 20 together.

Figure 3:
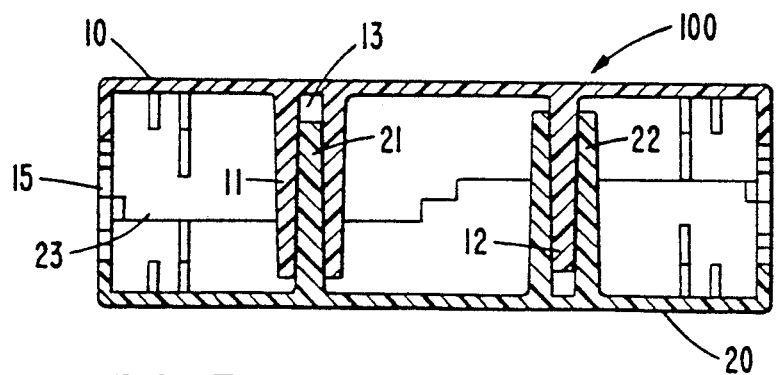
FIG. 3 is a cross-section of the FIG. 1 housing that illustrates how the shafts and cavities are joined.

FIG. 3 is a cross-section view of housing 100 that illustrates the manner in which shafts 12, 21 are joined to bosses 22, 11 respectively. Dimensional details of boss 11 are shown in FIG. 4 while dimensional details of shaft 21 are shown in FIG. 5.

Figure 4:
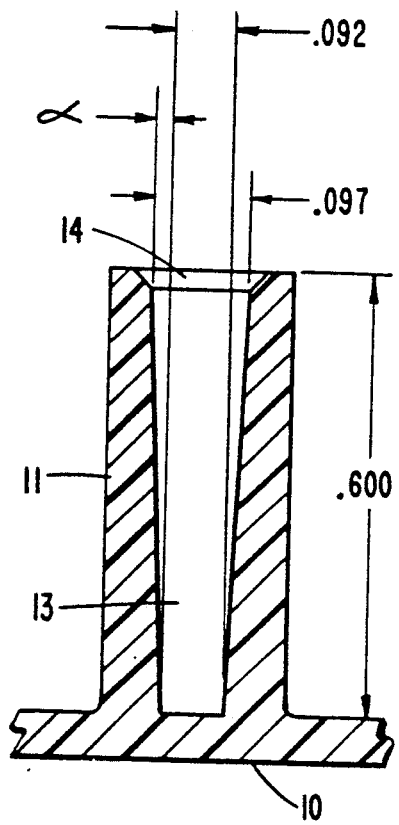
FIG. 4 discloses the cavity within a boss in detail showing illustrative dimensions.
Figure 5:
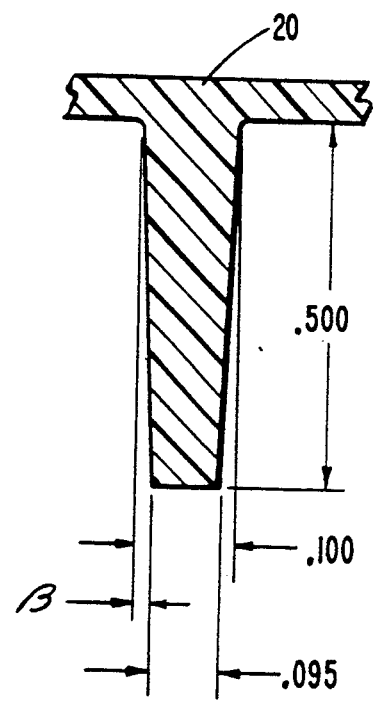
FIG. 5 discloses the shaft in great detail showing illustrative dimensions thereof.

Referring now to FIG. 4, there is shown a cross-section view of part 10 in the region of boss 11. Of particular importance is the shape of cavity 13 within boss 11 relative to the shape of mating shaft 21. In this illustrative embodiment, entrance 14 to cavity 13 is beveled to facilitate entry of mating shaft 21 during manufacture. The cavity 13 tapers from an entrance diameter of 0.097 inches to a bottom diameter of 0.092 inches. Since the length of cavity 13 is 0.6 inches, a draft angle $\alpha$ of approximately 0.5 degrees is formed. Comparing these dimensions now with the shaft shown in FIG. 5, it will be noticed that the shaft 21 is approximately 0.003 inches larger at both the top and bottom thereof. Note also that the length of the shaft 21 is slightly smaller than the length of cavity 13—a feature that allows for boss and shaft length tolerance and engagement variations. These dimensions define draft angle $\beta$ which is substantially the same as draft angle $\alpha$.

Shaft 21 will not completely enter cavity 13 without the application of force. Even after the application of force, shaft 21 and boss 11 may not stay permanently joined when subjected to moisture, temperature variations, vibration or repeated handling. Furthermore, if shaft 21 and boss 11 are not made of the same material, there may be a different thermal coefficient of expansion causing them to loosen as the temperature changes. It has been discovered, however, that shaft 21 can be thrust into cavity 13 at velocities sufficient to cause surface melting of the thermoplastic materials. After a brief cooling period (less than 1 second), shaft 21 is welded to boss 11. It has also been discovered, that a number of factors cooperate in the welding process. These factors include, but are not limited to: (1) relative dimensions of the shaft and cavity, (2) insertion speed, (3) thermoplastic materials used, (4) surface finish, (5) length of the shaft and cavity, (6) cross-section geometry of shaft/cavity (i.e., round, square, oval), and (7) draft angle.

Figure 6:
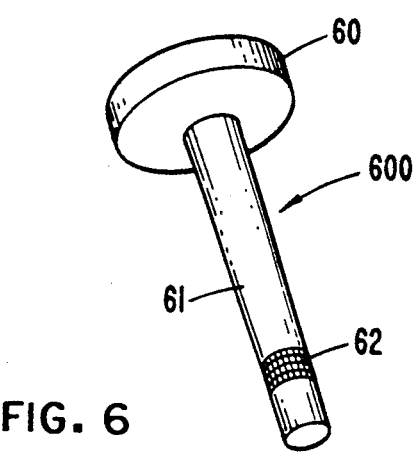
FIG. 6 discloses a shaft made from thermoplastic material in accordance with the invention.

In the example embodiment, when shaft and cavity are joined slowly, no welding occurs, and removal of the shaft from the cavity requires approximately 40 pounds of force. When the shaft and cavity are thrust together at a higher velocity, welding occurs and approximately 100 pounds of force are required to remove the shaft from the cavity. After removal, typical evidence of welding is illustrated in region 62 of the shaft shown in FIG. 6. In a preferred embodiment of the invention, shaft 21 and boss 11 each have round cross-sections and are made from ABS material. Using the indicated shaft and cavity dimensions (see FIG. 4 and 5), welding commences at speeds exceeding 50 inches per second. In the preferred embodiment of the invention, velocities of 80 inches per second are used.

Figure 7:
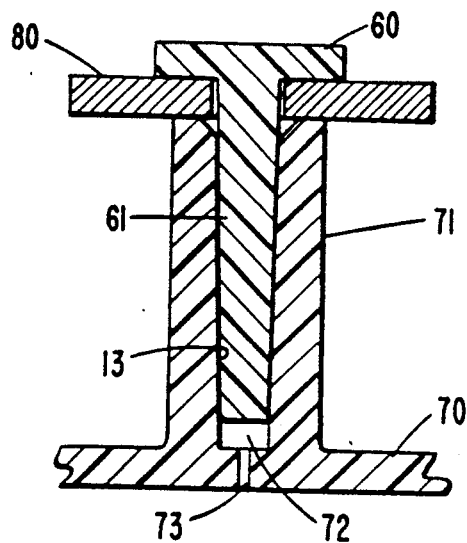
FIG. 7 discloses the use of the FIG. 6 shaft in joining two other parts together.

Referring once again to FIG. 6, shaft 600 is a separate and distinct part that is used like a nail. Shaft 600 includes shaft portion 61 that is generally smooth and straight, and becomes gradually narrower as it recedes from head portion 60. Shaft 600 is made from a thermoplastic material. A typical application of shaft 600 is shown in FIG. 7 where it is operative in permanently joining apparatus 80 to part 70. In this application, apparatus 80 need not be made from thermoplastic materials since it is captured by the cooperation of head portion 60 of shaft 600 and the upper portion of boss 71. In this particular application, the length of shaft 61 does not extend to the bottom of the cavity, and a region 72 is formed where air is compressed by the movement of the shaft into the cavity. This compressed air may be released to the outside through port 73. In the event that the designer does not wish to blemish the surface of part 70 with a hole, but is concerned that the air pressure in region 72 may be excessive, pressure can be decreased by using a shorter shaft 61 in order to increase the volume of region 72. Alternatively, longitudinal grooves along shaft 61 or a hole through its center can be used to eliminate pressure in region 72, particularly when shaft 61 completely fills the cavity 13.

Figure 8:
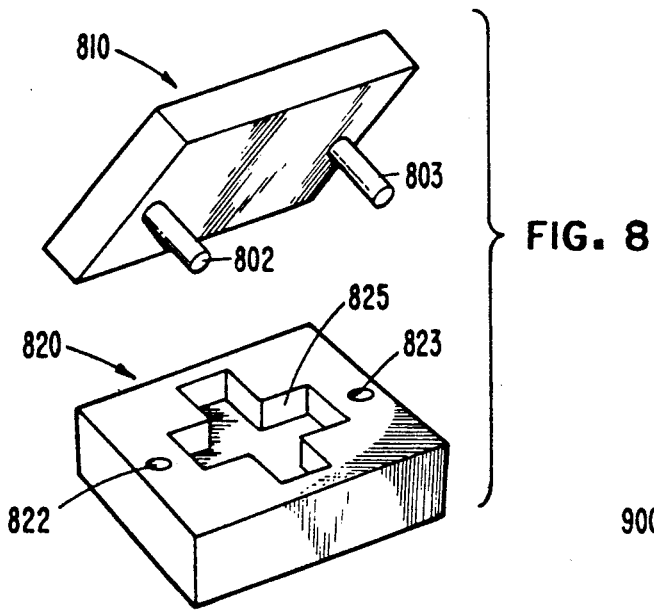
FIG. 8 discloses a fixture for holding the thermoplastic parts of FIG. 1 for welding in accordance with the invention.

FIG. 8 discloses equipment used in holding the thermoplastic housing 100 shown in FIG. 1. The equipment comprises an upper fixture 810 that joins with a lower fixture 820 during the welding process. The fixtures are made from machined aluminum stock, although other materials are acceptable and are typically chosen based on considerations such as cost and required durability. Upper fixture 810 includes alignment pins 802, 803 that mate with receiving holes 822, 823 of the lower fixture 820. Also contained in lower fixture 820 is a cavity 825 for receiving the thermoplastic housing to be welded. The depth of the cavity 825 corresponds to the finished depth of the thermoplastic housing so that when upper and lower fixtures 810, 820 are thrust together, the fixture absorbs the energy needed to halt further compression of the thermoplastic housing rather than the housing itself. Cavity 825 is shaped to receive the housing as well as a tool for removing it after welding is complete.

Figure 9:
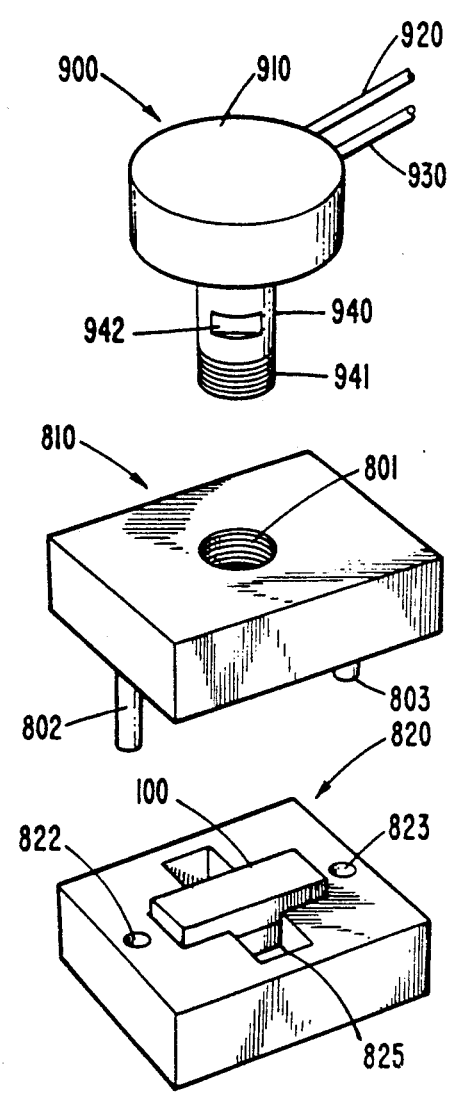
FIG. 9 discloses the fixture of FIG. 8 combined with an air cylinder that cooperate to perform welding in accordance with the present invention.

FIG. 9 provides additional detail surrounding the actual welding process. Apparatus 900 is a compact air cylinder that comprises a rigid housing 910 having a solid top surface and a solid bottom surface which includes a hole through which a shaft 940 protrudes. Attached to the top of shaft 940 is a generally flat plate that forms a seal with the inside walls of housing 910 and is driven up and down, much like a piston in an automobile engine, by air pressure delivered and removed via air supply lines 920 and 930. Supply line 920 delivers or removes air from the top surface of the plate while supply line 930 removes or delivers air to the bottom surface of the plate. Apparatus 900 is a commercially available compact air cylinder such as Stock No. 2A713 manufactured by Speedaire. Shaft 940 includes external threads 941 for joining with corresponding internal threads 801 of the upper fixture 810. Shaft 940 further includes slot 942 for holding the shaft 940 while being joined with upper fixture 810. Once the shaft 940 is joined to the upper fixture 810 which is inserted in lower fixture 820, the thermoplastic housing 100 awaits the downward thrust that causes welding. This downward thrust occurs when the air pressure in supply line 920 is increased to 90 psi in this example embodiment. Air rushes out of supply line 930 as the shaft 940 is driven downward. The downward movement of shaft 940 reaches a velocity of approximately 80 inches/second which is sufficient to cause acceptable welding of thermoplastic housing 100 using ABS materials having the dimensions shown in FIGS. 4–5. Thereafter, the upper and lower fixtures are separated when compressed air is delivered to the air cylinder 900 via supply line 930 and evacuated via supply line 920. This causes the shaft to be driven upward thus exposing the welded product for removal from the bottom fixture 820. Cooling is virtually instantaneous and assembly of the thermoplastic housing 100 is now complete.

It is understood that the disclosed welding technique may be advantageously used in connection with a wide variety of thermoplastic materials and a multitude of products. The deck and shell of a telephone handset may be permanently joined using the present invention as well as plastic toys, automobile parts, appliances and various electronic products to name but a few. Further, the invention finds application as a thermoplastic nail in which a hammer is used for join it with a mating thermoplastic cavity. So long as the velocity exceeds some minimum value determined by the thermoplastic materials used, as well as the relative dimensions of the nail and the cavity, welding will occur and the advantages of the invention will be realized. Accordingly, various modifications are possible without departing from the spirit and scope of the invention.

We claim:

1. A method for welding first and second thermoplastic parts together in a single stroke, the first part including a shaft, and the second part including a cavity of the same general shape as the shaft but of slightly smaller cross-section, the method comprising the steps of:

inserting the shaft of the first part into the cavity of the second part; and thrusting the shaft further into the cavity at a velocity sufficient to cause melting of the thermoplastic material of the parts in at least one region where the shaft and cavity are in contact, melting of the thermoplastic material being caused by frictional contact in an axial direction, during axial thrust of the shaft into the cavity, whereby welding occurs after the melted thermoplastic material cools.

2. The method of claim 1 wherein the thermoplastic material of the first and second parts is identical.

3. The method of claim 2 wherein the thermoplastic material comprises Acrylonitrile-Butadiene-Styrene.

4. The method of claim 3 wherein the velocity of insertion of the shaft into the cavity exceeds fifty inches per second.

5. The method of claim 1 wherein the cross-section of the shaft maintains its general shape, but gradually becomes wider along its length from its initial point of entry into the cavity.

6. The method of claim 5 wherein the cross-section of the shaft is substantially circular.

7. A manufacturing process for joining thermoplastic parts in a single stroke, one of said parts including an elongated linear shaft, the other of said parts including a cavity having the same general shape as the shaft but being slightly smaller in cross-section, the process comprising the steps of:

loading at least one of the thermoplastic parts into fixture having a recess whose shape generally conforms to the shape of the thermoplastic part placed therein;

inserting the linear shaft of said one of the parts into the cavity of said other of the parts; and thrusting the parts together at a velocity sufficient to cause melting of melting of the thermoplastic material in one more regions where the shaft and cavity are in moving contact, melting of the thermoplastic material being caused by frictional contact in an axial direction, during axial thrust of the shaft into the cavity.

8. A manufacturing process for joining thermoplastic parts and capturing apparatus therebetween in a single stroke, one of said parts including an elongated linear shaft, the other of said parts including a cavity having the same general shape as the shaft but being slightly smaller in cross-section, the apparatus comprising a surface having an opening therein, the process including the steps of:

loading at least one of the thermoplastic parts into a fixture having a recess whose shape generally conforms to the shape of the thermoplastic part placed therein;

inserting the linear shaft of said one of the parts through the opening in the apparatus and into the cavity of said other of the parts; and thrusting the parts together at a velocity sufficient to cause melting of the thermoplastic material in one or more regions where the shaft and cavity are in moving contact, melting of the thermoplastic material being caused by frictional contact in an axial direction, during axial thrust of the shaft into the cavity.

* * * * *